United States Patent
Jiang et al.

(10) Patent No.: US 10,202,280 B2
(45) Date of Patent: Feb. 12, 2019

(54) METHOD FOR PREPARING CARBON POWDER FROM ORGANIC POLYMER MATERIAL AND METHOD FOR DETECTING CRYSTAL MORPHOLOGY IN ORGANIC POLYMER MATERIAL

(71) Applicant: SUZHOU GRAPHENE-TECH CO., LTD., Suzhou, Jiangsu (CN)

(72) Inventors: Yonghua Jiang, Suzhou (CN); Jianmin Li, Jiangsu (CN); Jiandong Hao, Jiangsu (CN)

(73) Assignee: SUZHOU GRAPHENE-TECH CO., LTD., Suzhou, Jiangsu (CN)

( * ) Notice: Subject to any disclaimer, the term of this patent is extended or adjusted under 35 U.S.C. 154(b) by 59 days.

(21) Appl. No.: 15/315,398

(22) PCT Filed: Jun. 2, 2015

(86) PCT No.: PCT/CN2015/080559
§ 371 (c)(1),
(2) Date: Dec. 1, 2016

(87) PCT Pub. No.: WO2015/184969
PCT Pub. Date: Dec. 10, 2015

(65) Prior Publication Data
US 2017/0197837 A1    Jul. 13, 2017

(30) Foreign Application Priority Data

Jun. 4, 2014   (CN) .......................... 2014 1 0244717

(51) Int. Cl.
 *C01B 31/02* (2006.01)
 *D01F 9/12* (2006.01)
(Continued)

(52) U.S. Cl.
 CPC ................ *C01B 32/18* (2017.08); *C01B 3/00* (2013.01); *C01B 3/04* (2013.01); *C01B 32/15* (2017.08);
(Continued)

(58) Field of Classification Search
 CPC ............ C01B 31/0293; C01B 31/0206; C01B 32/152; C01B 32/154; C01B 32/156; C01P 2004/16; C01P 2004/32; C01P 2004/22
(Continued)

(56) References Cited

U.S. PATENT DOCUMENTS

| | | |
|---|---|---|
| 4,070,446 A | 1/1978 | Horikiri et al. |
| 6,099,960 A | 8/2000 | Tennent et al. |

(Continued)

FOREIGN PATENT DOCUMENTS

| | | |
|---|---|---|
| CN | 101817520 A | 9/1978 |
| CN | 101531765 | 9/2009 |

(Continued)

OTHER PUBLICATIONS

Siting et al., Plastic Material and Additive. Tianjin University Press. 1st edition. Jul. 1, 2007;14.
(Continued)

*Primary Examiner* — Daniel McCracken
(74) *Attorney, Agent, or Firm* — Wolf, Greenfield & Sacks, P.C.

(57) ABSTRACT

A method for preparing a carbon powder from an organic polymer material and a method for detecting the crystal morphology in the organic polymer material. A method for preparing a carbon material product comprises a carbonization step in which: a straight-chain polymer material containing nanoscale crystals is carbonized by using a strong oxidizing agent free of heavy metal ions, thus acquiring a (Continued)

nanoscale carbon material. Also disclosed is a method for acquiring either a material having a carbonized surface or a powder material containing graphene by using an acid in treating the organic polymer material.

15 Claims, 7 Drawing Sheets

(51) Int. Cl.

| | |
|---|---|
| C01B 32/18 | (2017.01) |
| C01B 3/00 | (2006.01) |
| C01B 3/04 | (2006.01) |
| C08J 7/12 | (2006.01) |
| C01B 32/15 | (2017.01) |
| C01B 32/184 | (2017.01) |
| B82Y 30/00 | (2011.01) |
| B82Y 40/00 | (2011.01) |

(52) U.S. Cl.
CPC .............. *C01B 32/184* (2017.08); *C08J 7/12* (2013.01); *B82Y 30/00* (2013.01); *B82Y 40/00* (2013.01); *C01B 2204/04* (2013.01); *C01B 2204/32* (2013.01); *C01P 2004/16* (2013.01); *C01P 2004/22* (2013.01); *C01P 2004/24* (2013.01); *C01P 2004/32* (2013.01); *Y02E 60/324* (2013.01); *Y02E 60/364* (2013.01); *Y02P 20/134* (2015.11); *Y10S 977/734* (2013.01); *Y10S 977/842* (2013.01); *Y10S 977/896* (2013.01)

(58) Field of Classification Search
USPC .................................. 423/445 R, 445 B, 460
See application file for complete search history.

(56) References Cited

U.S. PATENT DOCUMENTS

| | | |
|---|---|---|
| 2006/0210466 A1 | 9/2006 | Mitra et al. |
| 2006/0223947 A1 | 10/2006 | Olesik et al. |
| 2013/0084455 A1 | 4/2013 | Naskar et al. |
| 2013/0108540 A1 | 5/2013 | Baek et al. |
| 2017/0197838 A1 | 7/2017 | Jiang et al. |

FOREIGN PATENT DOCUMENTS

| | | |
|---|---|---|
| CN | 101618870 A | 1/2010 |
| CN | 103359728 A | 10/2013 |
| CN | 103539105 A | 1/2014 |
| CN | 103787320 A | 5/2014 |
| JP | S49-100331 B2 | 9/1974 |
| JP | S50-004324 A | 1/1975 |
| JP | H08-012310 | 1/1996 |
| JP | 2000-510201 A | 8/2000 |
| JP | 2003-086022 | 3/2003 |
| JP | 2004-115354 | 5/2004 |
| JP | 2004-238311 | 8/2004 |
| JP | 2008-510640 | 4/2008 |
| JP | 2009-268961 | 11/2009 |
| JP | 2010-195671 A | 9/2010 |
| JP | 2011-098843 A | 5/2011 |
| KR | 10-2013-0045736 | 10/2011 |
| WO | WO 2005/029508 A1 | 3/2005 |
| WO | WO 2009/143405 A2 | 11/2009 |
| WO | WO 2014/011460 A1 | 1/2014 |

OTHER PUBLICATIONS

International Search Report and Written Opinion for Application No. PCT/CN2015/072176 dated May 6, 2015.
International Preliminary Report on Patentability for Application No. PCT/CN2015/072176 dated Dec. 6, 2016.
International Search Report and Written Opinion for Application No. PCT/CN2015/080559 dated Sep. 11, 2015.
International Preliminary Report on Patentability for Application No. PCT/CN2015/080559 dated Dec. 6, 2016.
Chinese Office Action for Application No. 201580002366.5 dated Feb. 4, 2017.
Chinese Office Action for Application No. 201580002367.X dated Dec. 26, 2016.
Chinese Office Action for Application No. 201580002367.X dated Jul. 17, 2017.
Gohil et al., Crystallinity in chemically crosslinked low density polyethylenes: 3. Morphology of the XLPE-2 system. Polymer. Nov. 1986;27:1687-1695.
Hiroshi, Structural analysis of the crystalline polymer obtained by scattering method. NICHIAS technical time. Mar. 31, 2014;365.
Kalnins et al., Treatment of Polyethylene and Polypropylene with Chlorosulphonic Acid to Study the Surface Morphology. Polymer Testing. 1992;11:139-150.
Kanig, Kristallisier- und Schmelzvorgänge bei Polymeren. Colloid Polymer Sci. Apr. 1982;260(4):356-377.
Liu et al., Sulfated graphene as an efficient solid catalyst for acid-catalyzed liquid reactions. J Mat Chem. 2012;12.
Martinez-Salazar et al., Lamellar structure in melt crystallized low density polyethylene. Colloid Polymer Sci. 1983;261:412-416.
Schaper et al., Elektronenmikroskopische Untersuchungen an hochdruckkristallisiertem Polyäthylen. Faserforsch. Textiltechnik/Z. Polymerforsch. 29 (1978) 245-248.
STN Databaseaccession No. 152:195581. Fu et al. Feb. 18, 2010.
Wang et al., Synthesis and characterization of sulfonated graphene as a highly active solid acid catalyst for the ester-exchange reaction. Catal Sci Technol. 2013;3:1194.
Zhang et al., Thermal characterization of sulfonated polyethylene fibers. Thermo Acta. 1993;226:123-132.
Zhou et al., Binder-free phenyl sulfonated graphene/sulfur electrodes with excellent cyclability for lithium sulfur batteries. J. Mater Chem. 2014;2:5117.
Chen et al., Preparation of sulfonic-functionalized graphene oxide as ion-exchange material and its application into electrochemiluminescence analysis. Biosens Bioelectron. Mar. 15, 2011;26(7):3136-41. doi: 10.1016/j.bios.2010.12.015. Epub Dec. 16, 2010.

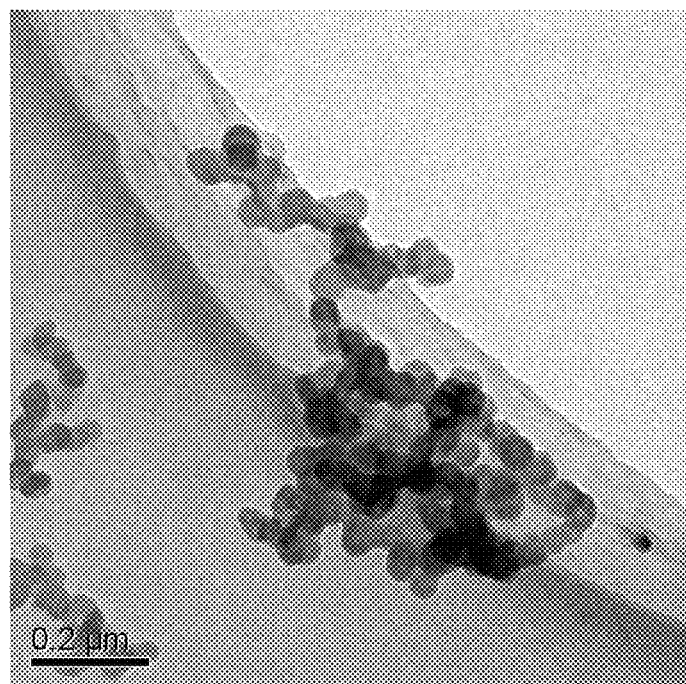
Fgiure 11
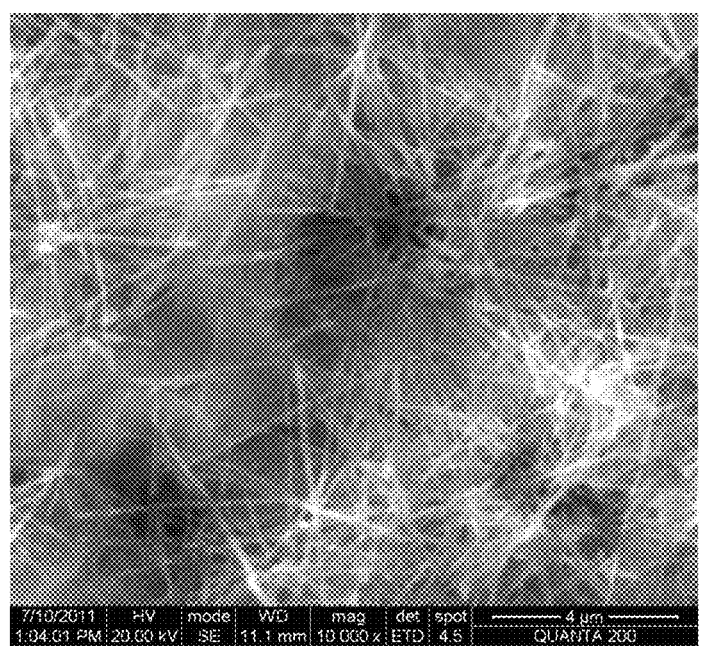
Figure 12

METHOD FOR PREPARING CARBON POWDER FROM ORGANIC POLYMER MATERIAL AND METHOD FOR DETECTING CRYSTAL MORPHOLOGY IN ORGANIC POLYMER MATERIAL

CROSS-REFERENCE TO RELATED APPLICATIONS

This application is a national stage filing under 35 U.S.C. § 371 of international application PCT/CN2015/080559 filed Jun. 2, 2015, which claims priority to Chinese Patent Application No. 201410244717, filed Jun. 4, 2014, the disclosures of each of which are incorporated by reference herein in their entirety.

TECHNICAL FIELD

Embodiments of the present invention relate to a method for preparing carbon powder from an organic polymer material and a method for detecting the crystal morphology in an organic polymer material. A second aspect of embodiments of the present invention relates to a method for treating an organic polymer material with an acid to obtain a material with a carbonized surface or a powder material containing graphene.

BACKGROUND

High temperature carbonization is generally employed in existing technology to prepare from polymers carbon materials in various forms. The crystallization process and crystal morphology of polymers have been studied for several decades. However, no final conclusion has yet been reached. Moreover, instability of the polymer crystallization under the conditions of stress or temperatures brings numerous difficulties for the research on the polymer crystallization. The final morphology of existing carbon materials prepared is relevant to the initial morphology of the materials, and the insufficient stability of polymers brings a great difficulty for the research on the polymer crystallization.

SUMMARY

In a first aspect of the present invention, a strong oxidant is used to preserve the crystal morphology of a polymer rapidly and to carbonize the polymer into a certain form such that carbon nanomaterials can be prepared in various forms having relation to the polymer crystallization on nanoscale. Therefore, a method for preparing carbon powder from an organic polymer material is provided. Furthermore, the first aspect of the present invention further provides a method for detecting the crystal morphology in an organic polymer material. In this method, by carbonizing crystals of the polymer in various crystallization process, the crystalline type and process of the polymer can be deduced backwards from the crystalline type of the final carbon material. The method for studying a polymer from the morphology of the final carbon material in combination with the crystal morphology of the polymer has not been reported in prior art.

Therefore, the first aspect of the present invention relates to the following contents:

Embodiment 1

A method for preparing a carbon material, comprising:
a carbonization step in which a straight-chain polymer material containing nanocrystals is carbonized by using a strong oxidant free of heavy metal ions, thus obtaining a carbon nanomaterial.

Embodiment 2

The method according to embodiment 1, wherein the straight-chain polymer material containing nanocrystals is polyolefins, polyacetylenes, or other straight-chain hydrocarbon polymeric materials with a symmetric structure; preferably, the straight-chain polymer material is a polymer with a symmetric structure; and more preferably, the straight-chain polymer material is selected from polyethylene wax, chlorinated polyethylene, polyacetylene, halogen-containing polyacetylenes, high density polyethylene, low density polyethylene, medium density polyethylene, polyvinyl chloride, halogen-containing polyolefins, and polypropylene.

Embodiment 3

The method according to embodiment 1 or 2, wherein the strong oxidant comprises one or more of the followings: a compound of a general formula R—$SO_3H$, wherein R is selected from F, Cl and Br; a combination of $H_2SO_4$ and HCl; a combination of $H_2SO_4$ and HF; concentrated sulfuric acid; fuming sulfuric acid; and a combination thereof; and preferably, the strong oxidant is fluorosulfonic acid, chlorosulfonic acid or a combination thereof.

Embodiment 4

The method according to any one of the aforementioned embodiments, wherein the weight ratio of the organic polymer material and the strong oxidant is from 1:1 to 1:300, preferably from 1:1 to 1:200, more preferably from 1:2 to 1:150, further more preferably from 1:2 to 1:120, more preferably from 1:3 to 1:100, more preferably from 1:4 to 1:90, more preferably from 1:5 to 1:80, more preferably from 1:9 to 1:75, more preferably from 1:10 to 1:70, more preferably from 1:13 to 1:65, and more preferably from 1:15 to 1:60.

Embodiment 5

The method according to any one of the aforementioned embodiments, wherein the carbonization step is carried out at a temperature which is from 1 to 50° C. lower, preferably from 2 to 40° C. lower, more preferably from 2 to 30° C. lower, more preferably from 2 to 20° C. lower, more preferably from 2 to 15° C. lower, more preferably from 2 to 10° C. lower, most preferably from 2 to 7° C. lower, further more preferably from 5 to 20° C. lower, than the crystallization temperature of the crystalline portion in the polymer material.

Embodiment 6

The method according to any one of the aforementioned embodiments, further comprising a pretreatment step which comprises: heating the polymer material to a temperature higher than the crystallization temperature; cooling to a temperature 2 to 7° C. lower than the crystallization temperature and maintaining the temperature for 1 to 100 hours, preferably 12 to 48 hours; cooling the polymer material to room temperature at a rate less than 1° C./minute such that onion-like nanocrystals are contained in the polymer material; wherein the carbon powder obtained by the method contains onion-like carbon nanospheres.

Embodiment 7

The method according to any one of embodiments 1 to 5, further comprising a pretreatment step which comprises: heating the polymer material to a temperature higher than the crystallization temperature; cooling to a temperature 2 to 7° C. lower than the crystallization temperature; stretching the polymer material at a speed of 1 cm/s to 1 m/s, preferably 5 cm/s to 20 cm/s, preferably 8 cm/s to 12 cm/s; quenching the stretched polymer material to room temperature at a rate higher than 20° C./minute such that fibrous nanocrystals are contained in the polymer material; wherein the carbon powder obtained contains carbon nanofibers.

Embodiment 8

A carbon nanomaterial, wherein the carbon nanomaterial contains sulfonic groups, and the carbon nanomaterial is fibrous, spherical, hexagonal, dendritical, or a combination thereof.

Embodiment 9

The carbon nanomaterial according to embodiment 8, wherein the content of the sulfonic groups is from 1 to 40%.

Embodiment 10

A method for detecting the crystal morphology in an organic polymer material, comprising:
a carbonization step in which the organic polymer material is carbonized by using a strong oxidant free of heavy metal ions, thus obtaining a carbon material; and
an observation and identification step in which the micromorphology of the carbon material is observed to reflect the crystal morphology in the organic polymer material.
A second aspect of the present invention relates to a method for treating an organic polymer material with an acid to obtain a material with a carbonized surface or a powder material containing graphene. The second aspect of the present invention relates to the following contents:

Embodiment 1

A method for treating a surface of a material to be treated or a method for preparing a material with a carbon-adhering surface, the method comprising: contacting an acid with the material to be treated to obtain a material with a carbon-adhering surface.

Embodiment 2

The method according to embodiment 1, wherein during the contact, the temperature of the acid is 25 to 150° C., preferably 30 to 130° C., preferably 40 to 120° C., preferably 45 to 110° C., preferably 50 to 100° C., preferably 55 to 95° C., preferably 60 to 90° C., preferably 65 to 85° C., preferably 70 to 80° C.

Embodiment 3

The method according the any one of the aforementioned embodiments, wherein the duration of the contact is 0.1 second to 30 days, preferably 1 second to 1 day, more preferably 10 seconds to 10 hours, more preferably 60 seconds to 1 hour, more preferably 300 seconds to 10 minutes.

Embodiment 4

The method according to any one of the aforementioned embodiments, wherein the weight ratio between the material to be treated and the acid is from 10000:1 to 1:10000, preferably from 5000:1 to 1:5000, more preferably from 2000:1 to 1:2000, more preferably from 1000:1 to 1:1000, more preferably from 500:1 to 1:500, more preferably from 100:1 to 1:100, more preferably from 50:1 to 1:50, more preferably from 10:1 to 1:100, more preferably from 1:1 to 1:90, more preferably from 1:2 to 1:80, more preferably from 1:3 to 1:70, more preferably from 1:4 to 1:50, more preferably from 1:5 to 1:40, more preferably from 1:8 to 1:30, more preferably from 1:9 to 1:25, more preferably from 1:10 to 1:15, more preferably from 1:11 to 1:13.

Embodiment 5

The method according to any one of the aforementioned embodiments, wherein the material to be treated is an organic polymer material, or the material to be treated is covered with an organic polymer material on a surface; and preferably, the organic polymer material is a plastic material.

Embodiment 6

The method according to embodiment 5, wherein the organic polymer material is selected from: polyolefin, such as polyethylene, polyvinyl chloride and chlorinated polyethylene; polyester; polyamide.

Embodiment 7

The method according to any one of the aforementioned embodiments, wherein the acid is a Lewis acid or a Brönsted acid.

Embodiment 8

The method according to any one of the aforementioned embodiments, wherein the acid is selected from organic acids or inorganic acids, such as organic sulfonic acids or inorganic sulfonic acids. In one embodiment, the surface carbon layer of the material with a carbon-adhering surface contains sulfonic groups.

Embodiment 9

The method according to any one of the aforementioned embodiments, wherein the acid is selected from fluorosulfonic acid, chlorosulfonic acid, sulfuric acid/hydrochloric acid mixture, sulfuric acid/hydrofluoric acid mixture, and any combination thereof.

Embodiment 10

The method according to any one of the aforementioned embodiments, wherein the concentration of the acid is higher than 80%, preferably higher than 81%, preferably higher than 82%, preferably higher than 83%, preferably higher than 84%, preferably higher than 85%, preferably higher than 86%, preferably higher than 87%, preferably higher than 88%, preferably higher than 89%, preferably higher than 90%, preferably higher than 91%, preferably higher than 92%, preferably higher than 93%, preferably higher than 94%, preferably higher than 95%, preferably higher than 96%, preferably higher than 97%, preferably higher than 98%, preferably higher than 99%, most preferably 99.5% to 100%.

Embodiment 11

A material with a carbon-adhered surface, wherein the material has a surface carbon layer, and the surface carbon layer has a surface resistance of $10^{14}\Omega$ to $10\Omega$, preferably $10^{13}\Omega$ to $10^{2}\Omega$, preferably $10^{12}\Omega$ to $10^{3}\Omega$, preferably $10^{11}\Omega$ to $10^{4}\Omega$, preferably $10^{10}\Omega$ to $10^{5}\Omega$, preferably $10^{9}\Omega$ to $10^{6}\Omega$, preferably $10^{8}\Omega$ to $10^{7}\Omega$. In an embodiment, the surface carbon layer is continuous, and is preferably visually continuous. In an embodiment, the surface carbon layer is smooth, and is preferably visually smooth.

Embodiment 12

The material with a carbon-adhered surface according to embodiment 11, wherein the surface carbon layer has a thickness of $10^{-9}$ to $10^{-1}$ meter, preferably $10^{-8}$ to $10^{-2}$ meter, preferably $10^{-7}$ to $10^{-3}$ meter, preferably $10^{-6}$ to $10^{-4}$ meter, preferably $10^{-5}$ to $10^{-3}$ meter.

Embodiment 13

The material with a carbon-adhered surface according to embodiment 11 or 12, wherein the surface carbon layer has a microporous structure, and wherein the micropore has a pore size of 0.001 to 100 micrometers, 0.004 to 50 micrometers, preferably 0.008 to 10 micrometers, preferably 0.01 to 8 micrometers, preferably 0.05 to 5 micrometers, preferably 0.1 to 1 micrometer, preferably 0.3 to 0.7 micrometer, preferably 0.4-0.6 micrometer.

Embodiment 14

The material with a carbon-adhered surface according to any one of embodiments 11-13, wherein the material with a carbon-adhered surface is prepared by the method according to any one of embodiments 1-10.

Embodiment 15

A product prepared by the method according to any one of embodiments 1-10 or a product prepared from the material with a carbon-adhered surface according to any one of embodiments 11-14.

Embodiment 16

The product according to embodiment 15, wherein the product is selected from a plastic electroplating product, an antistatic tube/plate/film, and a heat radiation sheet/film.

Embodiment 17

A method for preparing solid powder or a solution thereof, wherein the method comprises the following steps:
a. contacting an acid with a material to be treated, wherein the material to be treated contains an organic polymer material; preferably, the material to be treated is an organic polymer material; and more preferably, the organic polymer material is a plastic material; and
b. separating to obtain the solid powder or a solution of the solid powder.

Embodiment 18

The method according to embodiment 17, wherein during the contact, the temperature of the acid is 60 to 175° C., preferably 65 to 170° C., preferably 70 to 165° C., preferably 75 to 160° C., preferably 80 to 155° C., preferably 85 to 150° C., preferably 90 to 145° C., preferably 95 to 140° C., preferably 100 to 135° C., preferably 105 to 130° C., preferably 110 to 125° C., preferably 115 to 120° C.

Embodiment 19

The method according to any one of embodiments 17-18, wherein the duration of the contact is 5 minutes to 30 days, preferably 10 minutes to 15 day, more preferably 30 minutes to 72 hours, more preferably 1 hour to 40 hours, more preferably 2 hours to 30 hours, more preferably 5 hours to 24 hours, more preferably 10 hours to 20 hours, more preferably 12 hours to 18 hours.

Embodiment 20

The method according to any one of embodiments 17-19, wherein the weight ratio between the material to be treated and the acid is from 10000:1 to 1:10000, preferably from 5000:1 to 1:5000, more preferably from 2000:1 to 1:2000, more preferably from 1000:1 to 1:1000, more preferably from 500:1 to 1:500, more preferably from 100:1 to 1:100, more preferably from 50:1 to 1:50, more preferably from 10:1 to 1:100, more preferably from 1:1 to 1:90, more preferably from 1:2 to 1:80, more preferably from 1:3 to 1:70, more preferably from 1:4 to 1:50, more preferably from 1:5 to 1:40, more preferably from 1:8 to 1:30, more preferably from 1:9 to 1:25, more preferably from 1:10 to 1:15, more preferably from 1:11 to 1:13.

Embodiment 21

The method according to any one of embodiments 17-20, wherein the acid is maintained at a constant temperature for 5 to 60 minutes before contacting the acid with the material to be treated.

Embodiment 22

The method according to any one of embodiments 17-21, wherein the organic polymer material is selected from: polyolefin, such as polyethylene, polyvinyl chloride and chlorinated polyethylene; polyester; polyamide.

Embodiment 23

The method according to any one of embodiments 17-22, wherein the acid is a Lewis acid or a Brönsted acid.

Embodiment 24

The method according to any one of embodiments 17-23, wherein the acid is selected from organic acids or inorganic acids, such as organic sulfonic acids or inorganic sulfonic acids. In one embodiment, the solid powder contains sulfonic groups.

Embodiment 25

The method according to any one of embodiments 17-24, wherein the acid is selected from fluorosulfonic acid, chlorosulfonic acid, sulfuric acid/hydrochloric acid mixture, sulfuric acid/hydrofluoric acid mixture, and any combination thereof.

Embodiment 26

The method according to any one of embodiments 17-25, wherein the concentration of the acid is higher than 80%, preferably higher than 81%, preferably higher than 82%, preferably higher than 83%, preferably higher than 84%, preferably higher than 85%, preferably higher than 86%, preferably higher than 87%, preferably higher than 88%, preferably higher than 89%, preferably higher than 90%, preferably higher than 91%, preferably higher than 92%, preferably higher than 93%, preferably higher than 94%, preferably higher than 95%, preferably higher than 96%, preferably higher than 97%, preferably higher than 98%, preferably higher than 99%, most preferably 99.5% to 100%.

Embodiment 27

The method according to any one of embodiments 17-26, wherein the solubility of the solid powder in water is 5% to 30%, preferably 10% to 25%, more preferably 15% to 20%, most preferably 16% to 18%.

Embodiment 28

The method according to any one of embodiments 17-27, wherein the microscopic morphology of the solid powder is flaky, spherical, fibrous, or a combination thereof.

Embodiment 29

Solid powder or a solution of the solid powder prepared by the method according to any one of embodiments 17-28.

BRIEF DESCRIPTION OF THE DRAWINGS

In order to more clearly explain the embodiments of the present invention, some drawings related to the embodiments of the invention will be briefly described. Apparently, the drawings described below merely involve some embodiments of the present invention, and should not be understood as limitations on the present invention.

FIG. 11 shows a spherical carbon material produced by the method of Embodiment 15 of the present invention.

FIG. 12 shows a fibrous carbon material produced by the method of Embodiment 16 of the present invention.

DETAILED DESCRIPTION

Figure 1:
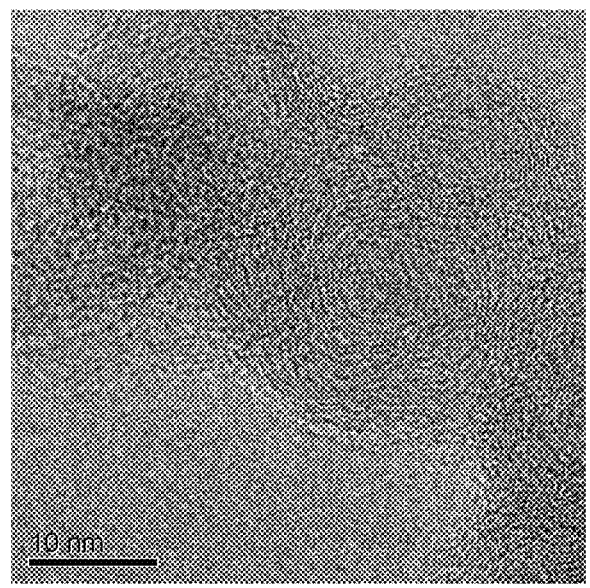
FIG. 1 is a transmission electron micrograph of an organic polymer material containing nanocrystals which is used in Embodiment 1 of the present invention.

As used in the present invention, the term "crystal size" means the size of the smaller extent of the crystals in an organic polymer material. For example, if the crystals of the organic polymer material are fibrous, then the crystal size means the diameter of the fibers; and if the crystals of the organic polymer material are spherical, then the crystal size means the diameter of the spherical crystals.

The term "nanocrystal" as used herein means that the crystal size is from 1 nanometer to less than or equal to 100 nm.

The term "carbon nanomaterial" as used herein means the carbon powder composing the carbon nanomaterial has a size of 1 nanometer to less than or equal to 100 nm. The size of carbon powder means the size of the smaller extent of the carbon powder. For example, if the carbon powder is carbon fiber microscopically, then the size is the diameter of the carbon fiber; and if the carbon powder is carbon sphere microscopically, then the size is the diameter of the carbon sphere.

In the present application, when a polymer material is mentioned to be "symmetric structurally" or "with a symmetric structure", it means that when the polymer carbon skeleton is taken as an axis, other atoms or short branched chains are symmetrically distributed on two sides of the polymer carbon skeleton and those other atoms or short branched chains symmetrically distributed account for over 60% of all the other atoms or short branched chains. In some embodiments, the symmetry is over 70%, or over 80%, or especially over 90%. Generally, the higher the structural symmetry of the polymer chain is, the easier the crystallization is.

The term "a strong oxidant free of heavy metal ions" herein means a strong oxidant which is composed of non-metal ions and can directly oxidize polymer materials to carbon materials. Examples of the strong oxidant are chlorosulfonic acid, fluorosulfonic acid, concentrated sulfuric acid, etc., and the combination of these strong oxidants. Herein, "free of heavy metal ions" means that the content of heavy metal ions is less than 100 ppm and no heavy metal ion is intentionally introduced into the strong oxidant. In some embodiments, the content of heavy metal ions is less than 50 ppm, or less than 10 ppm, or less than 5 ppm. In the present application, the terms "heavy metal ions" means ions formed from metals with a specific gravity greater than 5 grams/cubic centimeter. Such a metal comprises but is not limited to: copper, lead, zinc, iron, cobalt, nickel, manganese, cadmium, mercury, tungsten, molybdenum, gold, or silver.

In the present application, when "crystallization temperature" is mentioned, it means the crystallization temperature of the crystalline portion in the polymer material.

Some embodiments of the present invention provide a method for preparing a carbon material, comprising:

a carbonization step in which an organic polymer material (such as a straight-chain polymer material) containing nanocrystals is carbonized with a strong oxidant to obtain a carbon nanomaterial. For example, the carbonization step is contacting a strong oxidant with the organic polymer material (such as a straight-chain polymer material) containing nanocrystals to carbonize it, thereby obtaining a carbon nanomaterial. Preferably, the strong oxidant is free of heavy metal ions.

A method for preparing the carbon material of the present invention may be also described to comprise carbonizing straight-chain polymers which have various crystallization process and various crystalline state with a strong oxidant free of heavy metal ions to prepare carbon nanofibers, carbon nanospheres, and other carbon materials which have a morphology relevant to the crystal morphology of the polymers.

For example, the carbonization step comprises: using polyethylene, polyvinyl chloride and other straight-chain hydrocarbon polymer material with a relative symmetric structure as starting material; subjecting the starting material to for example different thermal treatments or different stretching or compressing treatments; using fluorosulfonic acid and/or chlorosulfonic acid as reaction medium; heating the reaction medium to a temperature of 60 to 150° C. and maintaining the temperature for 5 to 60 minutes under stirring; adding the starting material; reacting for 1 to 72 hours at a constant temperature; precipating and filtering the reaction product to obtain the carbon material product; drying the carbon material product to obtain a solid powder. Under a scanning electron microscope, the powder displays various morphology, such as fibrous, spherical, hexagonal, flaky and dendritical morphology.

Without being bound by theory, it is believed that the strong oxidant carbonizes the organic polymer material (such as a straight-chain polymer material) containing nanocrystals such that the crystal morphology of the polymer can be preserved rapidly and the polymer is carbonized into a certain form. The carbon nanomaterial finally obtained has a similar, even identical, morphology as that of the polymer crystals. The carbon nanomaterial produced may be used for various applications suitable for carbon materials. In the present invention, a strong oxidant free of heavy metals is used for the carbonization; therefore the carbon material produced is also free of heavy metals. Thus the carbon material produced by the method of the present invention may be specifically suitable for the applications in which a low heavy metal content is required.

There is no specific limitation on the organic polymer material containing nanocrystals that can be used in the method of the present invention. For example, the organic polymer material may be a straight-chain polymer material containing nanocrystals, and specifically may be polyolefins, polyacetylenes or other straight-chain hydrocarbon polymer materials with a symmetric structure. Preferably, the polyolefin is a polymer with a symmetric structure. In the present invention, useful organic polymer materials may be various linear high polymers, such as polyolefin homopolymer, polyolefin copolymer, preferably polymers having a carbon chain as the main chain, and for example may be selected from polyethylene, polyisobutylene, natural rubber, polybutadiene, styrene-butadiene rubber, polystyrene, polyvinyl chloride, polyacrylonitrile, and so on. The symmetry of these polymers may be over 60%, over 70%, or over 80%, or especially over 90%. Generally, the higher the structural symmetry of the polymer chain is, the easier the crystallization is. Where polyolefin is used as the organic polymer material, the polyolefin may be selected from polyethylene wax, chlorinated polyethylene, high density polyethylene, low density polyethylene, medium density polyethylene, polyvinyl chloride, halogen-containing polyolefins, and polypropylene. The polyolefin may be poly-$C_2$-olefin, poly-$C_3$-olefin, poly-$C_4$-olefin, poly-$C_5$-olefin, poly-$C_6$-olefin, poly-$C_7$-olefin, poly-$C_8$-olefin, poly-$C_9$-olefin or poly-$C_{10}$-olefin. Where polyacetylenes are used as the organic polymer material, the polyacetylenes may be polyethylene, poly-$C_{2-10}$-alkyne, or halogen-containing poly-$C_{2-10}$-alkynes. The poly-$C_{2-10}$-alkyne may be poly-$C_2$-alkyne, poly-$C_3$-alkyne, poly-$C_4$-alkyne, poly-$C_5$-alkyne, poly-$C_6$-alkyne, poly-$C_7$-alkyne, poly-$C_8$-alkyne, poly-$C_9$-alkyne or poly-$C_{10}$-alkyne. Additionally, the stereoregularity of the polymer material may also influence the crystallization of the polymer material. In some embodiments, the stereoregularity of the organic polymer material useful in the method of the present invention is greater than 65%, greater than 75%, greater than 80%, greater than 85%, greater than 90%, or even greater than 95%. Additionally, branching of the polymer material may also influence the crystallization properties of the polymer material. In some embodiments, the degree of branching of the organic polymer material useful in the method of the present invention is less than 15 branch chains per 1000 carbon atoms, less than 10 branch chains per 1000 carbon atoms, less than 8 branch chains per 1000 carbon atoms, less than 5 branch chains per 1000 carbon atoms, or less than 3 branch chains per 1000 carbon atoms.

There is no specific limitation on the strong oxidant useful in the method of the present invention as long as the purpose of the present invention can be achieved. Preferably, the strong oxidant is free of heavy metal ions. The strong oxidant may especially be oxidative sulfonating agent. Oxidative sulfonating agent means a sulfonating agent having an oxidation capability. The oxidation and sulfonation capability of the oxidative sulfonating agent may be provided by a single species or provided by different species respectively. For example, one species provides an oxidation capability, while another species provides a sulfonation capability. Typically, oxidative sulfonating agent is selected from: a compound of a general formula R—$SO_3H$, wherein R is selected from F, Cl and Br; a combination of $H_2SO_4$ and HCl; a combination of $H_2SO_4$ and HF; concentrated sulfuric acid; fuming sulfuric acid; $SO_3$; and a combination thereof. In some embodiments, the strong oxidant is fluorosulfonic acid, chlorosulfonic acid or a combination thereof. When the oxidative sulfonating agent is used, the carbon material obtained by the method of the present invention would contain sulfonate groups. The sulfonate groups are introduced as functional groups for the carbon material, thereby improving the hydrophilicity and other properties of the carbon material.

In the method of the present invention, there is no specific limitation on the amount of the strong oxidant as long as the purpose of the present invention can be achieved. However, the amount of the strong oxidant should generally be greater than or equal to the amount of the organic polymer material. In some embodiments, the weight ratio between the organic polymer material and the strong oxidant is from 1:1 to 1:300, preferably from 1:1 to 1:200, more preferably from 1:2 to 1:150, more preferably from 1:2 to 1:120, more preferably from 1:3 to 1:100, more preferably from 1:4 to 1:90, more preferably from 1:5 to 1:80, more preferably from 1:9 to 1:75, more preferably from 1:10 to 1:70, more preferably from 1:13 to 1:65, more preferably from 1:15 to 1:60.

Increase of the amount of the oxidant facilitates the acceleration of the carbonization step and functionalizes the carbon nanomaterial obtained, such as introduces sulfonate groups. However, decrease of the amount of the oxidant is advantageous in terms of cost.

Just before the carbonization step, the crystal size in the organic polymer material containing nanocrystals used in the method of the present invention is 1 nm to 100 nm, preferably 5 nm to 100 nm, preferably 10 nm to 100 nm, preferably 20 nm to 90 nm, preferably 30 nm to 80 nm, preferably 40 nm to 70 nm, preferably 50 nm to 60 nm. The crystal size in the polymer material corresponds to the size of the carbon material produced. When the molecular crystal size is larger than nanoscale, such as larger than 100 nm, it may result in an incomplete carbonization such that the corresponding carbon material can not be obtained while only polymer crystals coated with carbon are obtained and the carbon material obtained would have a larger size, which impedes the sufficient effect of the carbon material in actual applications. Without being bound by theory, it is believed that when the molecular crystal size is too small, the carbon atoms may be functionalized during the carbonization process, and thus the functionalized carbon particles obtained may be easily dissolved in solvents or reaction mediums and be difficult to be recovered in a simple and efficient way.

In some embodiments of the method for preparing the carbon material of the present invention, just before the carbonization step is carried out, the degree of crystallinity of the polymer material is equal to or greater than 10%, equal to or greater than 30%, preferably equal to or greater than 40%, preferably equal to or greater than 50%, preferably equal to or greater than 60%; while the degree of crystallinity may preferably less than 90%, preferably less than 80% or less than 70%. In the method of the present invention, the crystalline portion of the polymer material is converted into the carbon material to be recovered, while the amorphous portion is usually oxidized completely and consumed. Therefore, when the degree of crystallinity is higher, the yield of the carbon material obtained is higher. However, in terms of the ease of production, the degree of crystallinity of the organic polymer material used in the present invention may be for example less than 90% or less than 80%. The lower degree of crystallinity would avoid the interaction of crystals in the polymer material and also avoid a complicated crystal morphology.

In the method of the present invention, the reaction temperature is lower than the crystallization temperature of the crystalline portion in the polymer material. In some embodiments, the carbonization step is carried out at a temperature from 1 to 50° C. lower, preferably from 2 to 40° C. lower, more preferably from 2 to 30° C. lower, more preferably from 2 to 20° C. lower, more preferably from 2 to 15° C. lower, more preferably from 2 to 10° C. lower, most preferably from 2 to 7° C. lower, than the crystallization temperature of the crystalline portion in the polymer material.

The reaction temperature of the carbonization step is preferably lower than the crystalline temperature of the organic polymer material such that the crystal morphology of the polymer material would not be damaged during the reaction and thus a desirable carbon material can be obtained. On the contrary, the reaction temperature should not be too low. A higher reaction temperature enables the reaction to proceed more rapidly, enables the size of crystals in the polymer material not to be further increased, and ensures desirable nanocrystals to be obtained.

In the method of the present invention, there is no specific limitation on the duration of the carbonization reaction. Generally, the duration of the carbonization reaction is half an hour to 10 days, as required. In some embodiments, the duration of the carbonization step is from 1 to 120 hours, preferably from 2 to 72 hours, preferably from 3 to 60 hours, or from 5 to 40 hours, or from 8 to 20 hours. The longer carbonization time facilitates both the complete carbonization reaction and the functionalization reaction of the obtained carbon material. However, the carbonization time should not be too long. Suitable carbonization time enables the carbon material not to be functionalized excessively, thereby ensuring the productivity of the carbon material. Moreover, in terms of production efficiency, too long carbonization time is not suitable.

In some embodiments, the method for producing the carbon material of the present invention further comprises a pretreatment step. The pretreatment step is used mainly to form a desirable morphology of crystals in the polymer material, thereby obtaining a carbon material having a desirable morphology.

In some embodiments, the pretreatment step comprises: heating the polymer material to a temperature higher than the crystallization temperature; cooling to a temperature from 2 to 7° C. lower than the crystallization temperature and maintaining the temperature for 1 to 100 hours, preferably 12 to 48 hours; cooling the polymer material to room temperature or a temperature below room temperature at a rate of 1° C./minute such that onion-like nanocrystals are contained in the polymer material. In this case, the carbon powder obtained by the method contains onion-like carbon nanospheres. However, the method for preparing spherical crystals in a polymer material is not limited hereto.

In some embodiments, the method comprises: selecting polyethylene with a low degree of branching of less than 5 branch chains per 1000 carbon atoms and a high symmetry of greater than 80% before the carbonization; heating the polyethylene to a temperature higher than the crystallization temperature; then crystallizing at a temperature 2 to 7° C. lower than the crystallization temperature for 1 to 100 hours; cooling slowly to room temperature; treating the polyethylene material with a strong oxidant free of heavy metals at a temperature lower than the crystallization temperature such that onion-like carbon spheres may be prepared. The carbon spheres have a high purity, a superior crystal morphology, and a diameter of 5 to 500 nm.

In some embodiments, the pretreatment step comprises: heating the polymer material to a temperature higher than the crystallization temperature; cooling the polymer material to a temperature from 2 to 7° C. lower than the crystallization temperature; stretching the polymer material at a speed of 1 cm/s to 1 m/s, preferably 5 cm/s to 20 cm/s, preferably 8 cm/s to 12 cm/s; quenching the stretched polymer material to room temperature or a temperature below room temperature at a rate higher than 20° C./minute such that fibrous nanocrystals are contained in the polymer material. In this case, the carbon powder obtained contains carbon nanofibers. However, the method for preparing fibrous crystals in a polymer material is not limited hereto.

In the above embodiments, "a temperature from 2 to 7° C. lower than the crystallization temperature" comprises the temperatures 2° C. lower, 3° C. lower, 4° C. lower, 5° C. lower, 6° C. lower, 7° C. lower, than the crystallization temperature. In some embodiments, the temperature at which the polymer material is crystallized in the pretreatment step may be in a range of from the crystallization temperature to a temperature 1° C. lower than the crystallization temperature.

In some embodiments, the method comprises: selecting polyethylene with a low degree of branching of less than 5 branch chains per 1000 carbon atoms and a high symmetry of greater than 80% before the carbonization; stretching at a speed of 1 cm/s to 1 m/s under stress; cooling rapidly by liquid nitrogen; and then carrying out the above-mentioned carbonization step such that carbon fibers can be prepared with a high purity. The fibrous carbon material has a diameter of 1 to 500 nm and a length of 0.005 micrometer to 500 micrometers.

In some embodiments of the method for preparing the carbon material of the present invention, the shape of the carbon nanomaterial is the same as the shape of the crystals in the polymer material; and the difference between the size of the carbon nanomaterial and the size of the crystals in the polymer materials is less than 20%, less than 15%, less than 10% or less than 5%.

In some embodiments of the method for preparing the carbon material of the present invention, the carbon nanomaterial has one or more of the fibrous, spherical, hexagonal, dendritical shapes, etc.

Some embodiments of the present invention provide a carbon nanomaterial wherein the carbon nanomaterial contains sulfonic groups. In above-mentioned methods, if the strong oxidant free of heavy metals is oxidative sulfonating agent, the carbon nanomaterial obtained typically contains sulfonic groups. The carbon nanomaterial obtained does not contain heavy metals but contains sulfonate groups, which enables the carbon material to be used for water treatment very advantageously. The sulfonate groups can remove heavy metal ions in water and can remove calcium and magnesium ions to a certain extent; while the carbon material can act as an adsorbent. On the other hand, when the carbon material is used as a filler, the carbon material contains some functional groups which enable a closer bonding between the carbon material and the substrate.

In some embodiments, the content of the sulfonate groups in the carbon nanomaterial of the present invention is from 1 to 40%, such as 2 to 35%, 3 to 32%, 4 to 30%, 5 to 28%, 6 to 25%, 7 to 23%, 8 to 20%, 10 to 18%.

In some embodiments, the carbon nanomaterial of the present invention has one or more of the fibrous, spherical, hexagonal, dendritical, flaky shapes, etc.

In some embodiments, the carbon nanomaterial of the present invention has a size of 1 nm to 100 nm, preferably 5 nm to 100 nm, preferably 10 nm to 100 nm, preferably 20 nm to 90 nm, preferably 30 nm to 80 nm, preferably 40 nm to 70 nm, preferably 50 nm to 60 nm.

In some embodiments, the carbon nanomaterial has a degree of crystallinity of greater than 50%, preferably greater than 60%, preferably greater than 70%, preferably greater than 80%, preferably greater than 90%.

Some embodiments of the present invention further relates to a use of the carbon nanomaterial of the present invention. It may be used as electrically conductive material or heat conductive material. It may be used in lithium battery, especially in cathode material. It may be used in water treatment. It may be used as reinforcing material, or a filler, etc.

Thus, the present invention further relates to a lithium battery cathode material containing the carbon nanomaterial of the present invention. The cathode material may be lithium iron phosphate cathode material, but is not limited hereto. When the cathode material contains 1 wt % to 10 wt % of the carbon nanomaterial of the present invention, the discharge specific capacity of the cathode material may reach about 160 mAh/g.

The present invention also relates to an organic polymer material filled with the carbon nanomaterial of the present invention. The polymer material is preferably polyamide, polyester, etc. Generally, when the carbon nanomaterial is used as a filler, the amount thereof may be 2 wt % to 20 wt %, but the amount range may be different according to uses and is not limited hereto. For example, when the polymer material is Nylon 66, using 2 wt % to 8 wt % of the carbon nanomaterial of the present invention as a filler would improve the tensile strength of Nylon 66 by more than 50% and the flexural strength by more than 30%.

Some embodiments of the present invention provide a method for detecting the crystal morphology in an organic polymer material, comprising:

a carbonization step in which the organic polymer material is carbonized with a strong oxidant to obtain a carbon material. Preferably, the strong oxidant is free of heavy metal ions.

The detection method further comprises an observation and identification step in which the micromorphology of the carbon material is observed to reflect the crystal morphology in the organic polymer material.

In one embodiment, the method for detecting the crystal morphology in the organic polymer material comprises crystallizing and carbonizing the polymer material; and deducing backwards the crystalline type and/or process of the polymer from the crystal type of the final carbon material. The carbonization step herein comprises carbonizing the polymer material with a strong oxidant to prepare the carbon material. The strong oxidant is preferably a strong oxidant free of heavy metal ions. The method further comprises: observing the micromorphology of the carbon powder obtained which reflects the information of the crystal morphology in the organic polymer material.

In some embodiments, the crystallization temperature of the organic polymer material is detected before the carbonization step. The method for detecting the crystallization temperature of the crystals in the polymer material is known by a person skilled in the art. For example, the crystallization temperature of the crystals in the polymer material may be determined by thermogravimetry analysis method, differential scanning calorimetry (DSC), and other methods.

In some embodiments, the carbonization step is carried out at a temperature 1 to 50° C. lower, preferably 2 to 40° C. lower, more preferably 2 to 30° C. lower, more preferably 2 to 20° C. lower, more preferably 2 to 15° C. lower, more preferably 2 to 10° C. lower, most preferably 2 to 7° C. lower, than the crystallization temperature of the organic polymer material.

In some embodiments, the duration of the carbonization step is 1 to 120 hours, preferably 2 to 72 hours, preferably 3 to 60 hours, or 5 to 40 hours, or 8 to 20 hours.

A second aspect of the present invention relates to a method for treating an organic polymer material with an acid to obtain a material with a carbonized surface or a powder material containing graphene.

In the present application, the terms "graphene-like" and "functionalized graphene" means graphene containing a functional group on the surface. The functional group is preferably sulfonic group.

In one specific embodiment, the present invention relates to a method for adhering carbon on the surface of an organic polymer material (or other materials with an organic polymer material adhered on the surface), the product and the use thereof.

In the present invention, straight-chain olefin polymers such as polyethylene, polyvinyl chloride and chlorinated polyethylene, or other materials (such as ceramics, metals and other nonmetal materials) with a straight-chain olefin polymer coated on the surface are used as starting material. The starting material is immersed in fluorosulfonic acid and/or chlorosulfonic acid and/or sulfuric acid/hydrochloric acid, sulfuric acid/hydrofluoric acid mixture or other superstrong oxidative acid at a temperature of 25 to 150° C. and reacted for 1/3600 to 24 hour(s), thereby obtaining an intermediate/final product in which the starting material is coated with carbon on the surface. The weight ratio of the organic polymer material and the acid is from 10000:1 to 1:10000, preferably from 5000:1 to 1:5000, more preferably from 2000:1 to 1:2000, more preferably from 1000:1 to 1:1000, more preferably from 500:1 to 1:500, more preferably from 100:1 to 1:100, more preferably from 50:1 to 1:50, more preferably from 10:1 to 1:100, more preferably from 1:1 to 1:90, more preferably from 1:2 to 1:80, more preferably from 1:3 to 1:70, more preferably from 1:4 to 1:50, more preferably from 1:5 to 1:40, more preferably from 1:8 to 1:30, more preferably from 1:9 to 1:25, more preferably from 1:10 to 1:15, more preferably from 1:11 to 1:13.

The intermediate/final product is characterized in that: the surface carbon layer is a layer of continuous black material with a glabrous surface; the thickness of the carbon layer is in the range of $0.4*10^{-6}$ to 5 mm; the surface carbon layer has a microporous structure with a pore size of 0.004 to 10 micrometers; the surface resistance is in the range of $10^{12}$ to $10^3 \Omega$ as determined by an universal electric meter. Based on the characteristics of the carbon material itself, the intermediate/final product may be widely used in electric conduction, heat conduction, corrosion resistance, abrasion resistance, flame retardancy, coloration, electroplating, wave absorption, fluorescence shielding, radiation protection, and lubricant of materials, and other fields.

Intermediate/Final Uses of the Product:

Plastic Electroplating: when this material coated with carbon on the surface is used as the plastic material to be electroplated, roughening or other pretreatment processes are not required. The subsequent processes can be carried out after depositing palladium directly. The method has the following advantages: 1. the conventional plastic electroplating process has heavy metal pollution problem, while the method of the present invention avoids the main pollution source, hexavalent chromium, which is derived from roughening processes, thereby reducing the pollution and being environmentally friendly; 2. the main type of plastic electroplating currently on the market is ABS and it has been desirable to develop electroplating of other materials of polyethylene type in industry for decades, however, success can not be achieved until the present invention, which expands the plastic electroplating types.

Antistatic Tube/Plate/Film: This material coated with carbon on the surface may be directly used as antistatic tube/plate/film. Existing antistatic tube/plate/film is obtained by incorporating a conductive additive into a starting material and then extruding them. The problems existing in the process are mainly: 1. the conductive additive is mainly carbon black, and adding it and granulating the raw material would result in serious dust; 2. mechanical properties of the raw material system is decreased after incorporation of the conductive additive; 3. the flow stability of the materials is poor during the extrusion. By using the present invention, the raw material can be extruded and the extruded tube may be directly used after surface treatment, therefore the above disadvantages can be overcome. Moreover, the surface resistance can reach $10^3 \Omega$. Generally, the better the electrical conductivity is, the more the required amount of the conductive additive is and the greater the effect on the performance of the product is. By using the material of the present invention, these problems would be been avoided. By using the present method, the price of an antistatic tube/plate/film may be greatly decreased. In comparison with existing methods, the price may be decreased by 10 to 50%.

Heat Radiation Sheet/Film: This material coated with carbon on the surface may be directly used as heat radiation material. When the temperature of a heat source is 50 to 90° C., the temperature of the material may be decreased by 3 to 30° C. By using the present invention, the thickness of the carbon coating on the surface can be controlled and the thickness of the final material product may be determined by the material itself. For example, the thickness of the film can be less than 10 micrometers according to different materials, while most of existing heat conductive film materials has a thickness greater than 10 micrometers.

Additionally, the second aspect of the present invention further relates to a method for preparing solid powder, the solid powder, and a solution containing the solid powder. In one embodiment, the solid powder contains functionalized graphene.

In the present invention, straight-chain olefin polymer, such as polyethylene, polyvinyl chloride and chlorinated polyethylene, is used as starting material. Fluorosulfonic acid and/or chlorosulfonic acid and/or sulfuric acid/hydrochloric acid and/or sulfuric acid/hydrofluoric acid mixture or other superstrong oxidative acid is used as reaction medium. The reaction medium is heated to a temperature of 60 to 150° C. and maintained at this temperature for 5 to 60 minutes. Afterwards, the raw material is added and reacted at a constant temperature for 1 to 24 hours. The reaction mixture is separated to obtain an aqueous solution product. It is dried to obtain the solid powder. The weight ratio of the organic polymer material and the acid is from 10000:1 to 1:10000, preferably from 5000:1 to 1:5000, more preferably from 2000:1 to 1:2000, more preferably from 1000:1 to 1:1000, more preferably from 500:1 to 1:500, more preferably from 100:1 to 1:100, more preferably from 50:1 to 1:50, more preferably from 10:1 to 1:100, more preferably from 1:1 to 1:90, more preferably from 1:2 to 1:80, more preferably from 1:3 to 1:70, more preferably from 1:4 to 1:50, more preferably from 1:5 to 1:40, more preferably from 1:8 to 1:30, more preferably from 1:9 to 1:25, more preferably from 1:10 to 1:15, more preferably from 1:11 to 1:13.

The product may be in a form of an aqueous solution or solid powder. The product is characterized in that: 1. The final product is carbon material having a color of brown-yellow or brown or black and a morphology of graphene-like sheet and/or sphere and/or fiber and other various types; 2. the final product is provided with sulfonic groups, and the solubility in aqueous solution may reach 20% at pH of 4 to 6, and the viscosity is low; 3. the diameter of the graphene-like product may reach 100 micrometers; the thickness is controllable in the thickness range of 0.5 to 100 nm; and the homogeneity exceeds 90%; 4. the spherical carbon material has a good crystallinity, and the sphere diameter is 5 to 100 nm; 5. the fibrous carbon material has a diameter of 1 to 500 nm, a length of 0.005 to 500 micrometers, and a relative good crystallinity; 6. the surface resistance of a film formed of the product may reach 103 ohms.

EMBODIMENTS

In the embodiments of the present invention, the following materials are used, and other materials are conventional or may be purchased from the market:

TABLE 1

| Materials | Sources | Property (crystallization temperature and degree of crystallization of the polymer material) |
|---|---|---|
| Low density polyethylene | Yanshan Petrochemical, LDPE | crystallization temperature is 110° C.; degree of crystallization is 35 to 50% |
| Medium density polyethylene | Yanshan Petrochemical, MDPE | crystallization temperature is 127° C.; degree of crystallization is 70 to 80% |
| High density polyethylene | Yanshan Petrochemical, HDPE 5000S | crystallization temperature of the material is 136° C.; degree of crystallization is 80 to 90% |
| Polyvinyl chloride | Qilu Petrochemical, PVC s1000 | glass transition temperature is 76° C. |
| Fuming sulfuric acid | Tianjin Bohai Chemical Engineering Group, fuming sulfuric acid | Light brown viscous fuming liquid |
| Chlorosulfonic acid | Tianjin Bohai Chemical Engineering Group, chlorosulfonic acid | Light yellow liquid |
| Fluorosulfonic acid | Dandong Zhonghe Chemical Engineering Factory, fluorosulfonic acid | Colorless transparent liquid |

Test Methods

Crystal morphology of organic polymer material is determined by transmission electron microscope (TEM) in the present invention.

Content of sulfonate groups is determined by element analysis method in the present invention.

Embodiments 1-11 relate to the first aspect of the present invention.

Embodiment 1: Preparing Spherical Carbon Material from High Density Polyethylene The crystallization temperature of the high density polyethylene HDPE 5000S was 136° C., and the degree of crystallization was 80 to 90%.

10 parts by weight of high density polyethylene HDPE 5000S was melted and the temperature was raised to 180° C. and then decreased slowly to 130° C. The temperature was maintained at 130° C. for 48 hours, and then decreased slowly to room temperature. The treated polyethylene was ready for use.

The treated polyethylene was stained with uranyl vinyl acetate. After an ultra thin section was cut, the crystal of the treated polyethylene was observed under transmission electron microscope, as shown in FIG. 1. It was seen from FIG. 1 that the crystal of the treated polyethylene was a spherical crystal with a size of 30 to 60 nm.

Figure 2:
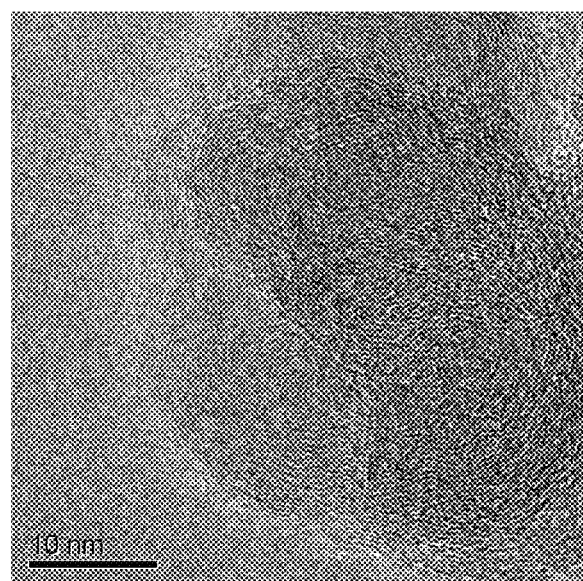
FIG. 2 is a transmission electron micrograph of a carbon material obtained in Embodiment 1 of the present invention.

500 parts by weight of chlorosulfonic acid with a purity of greater than 98% was used as reaction medium. Under the conditions of oil bath or vapor, the temperature was raised to 120° C. 10 parts by weight of the treated high density polyethylene were added and reacted at a constant temperature for 12 hours. The resultant product was stood and filtered to obtain 7 parts by weight of powder solid. X-ray diffraction of the solid showed that it was carbon material; scanning electron microscope showed that it was mostly spherical material and the size of the carbon sphere was 30 to 60 nm; and transmission electron microscope showed that the spherical material had onion-like crystals and exhibited good crystal morphology, as shown in FIG. 2. It was found by elemental analysis that the content of sulfonate groups in the carbon nanomaterial was 5%.

Embodiment 2: Preparing Fibrous Carbon Material from High Density Polyethylene 10 parts by weight of high density polyethylene HDPE 5000S was melted and the temperature was raised to 200° C. Then under the constant temperature of 125° C., the polyethylene was stretched slowly at a rate of 10 cm/s. The stretched sample was quenched in liquid nitrogen. The treated polyethylene was ready for use.

Figure 3:
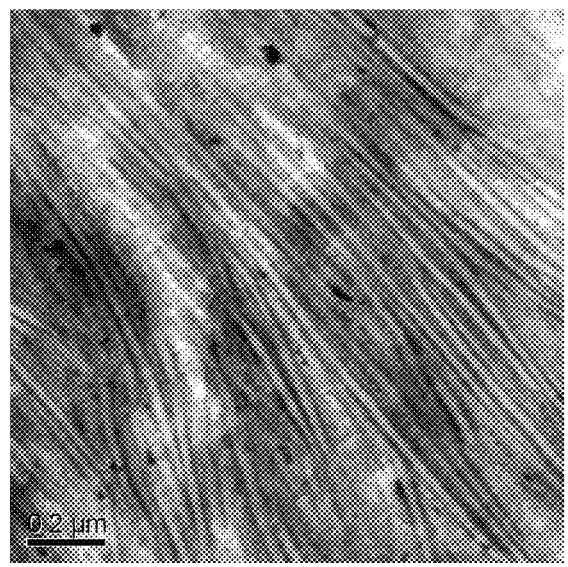
FIG. 3 is a transmission electron micrograph of an organic polymer material containing nanocrystals which is used in Embodiment 2 of the present invention.

The crystal of the treated polyethylene was tested by transmission electron microscope method, as shown in FIG. 3. As seen from FIG. 3, the crystal of the treated polyethylene was a fibrous crystal with a diameter of 10 to 30 nm and a length of 30 to 100 micrometers.

Figure 4:
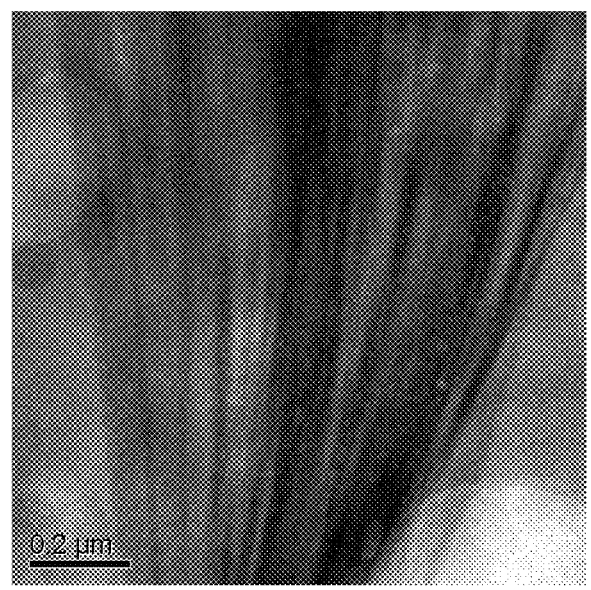
FIG. 4 is a transmission electron micrograph of a carbon material obtained in Embodiment 2 of the present invention.
Figure 5:
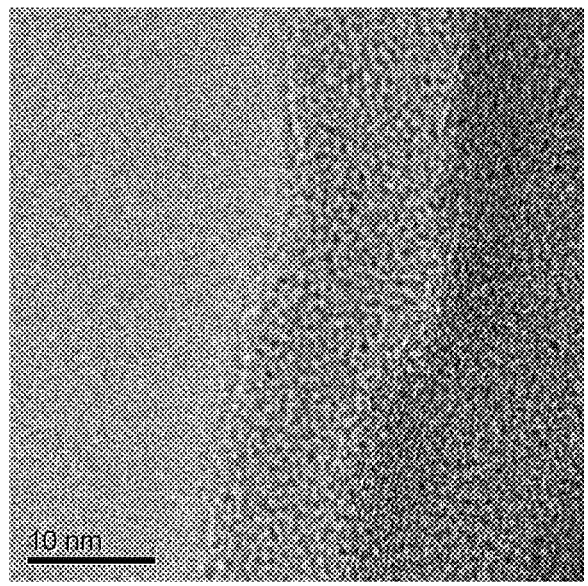
FIG. 5 is a transmission electron micrograph of a carbon material obtained in Embodiment 2 of the present invention, wherein the crystallization of one carbon fiber is shown.

500 parts by weight of chlorosulfonic acid with a purity of greater than 98% was used as reaction medium. Under the conditions of oil bath or vapor, the temperature was raised to 120° C. 10 parts by weight of the pretreated high density polyethylene were added and reacted at a constant temperature for 12 hours. The resultant product was stood and filtered to obtain 6 parts by weight of powder solid. X-ray diffraction of the solid showed that it was carbon material; scanning electron microscope showed that it was mostly fibrous; and the fiber had a diameter of 10 to 30 nm and a length of 30 to 100 micrometers; and transmission electron microscope showed that the crystal of the fibrous material was relative integral, as shown in FIGS. 4 and 5. It was found by elemental analysis that the content of sulfonate groups in the carbon nanomaterial was 3%.

Embodiment 3

10 parts by weight of high density polyethylene HDPE 5000S was melted and the temperature was raised to 200° C. and then decreased slowly to 130° C. The temperature was maintained at 127° C. for 1 minute and then the polyethylene was quenched in liquid nitrogen. The treated polyethylene was ready for use.

Figure 6:
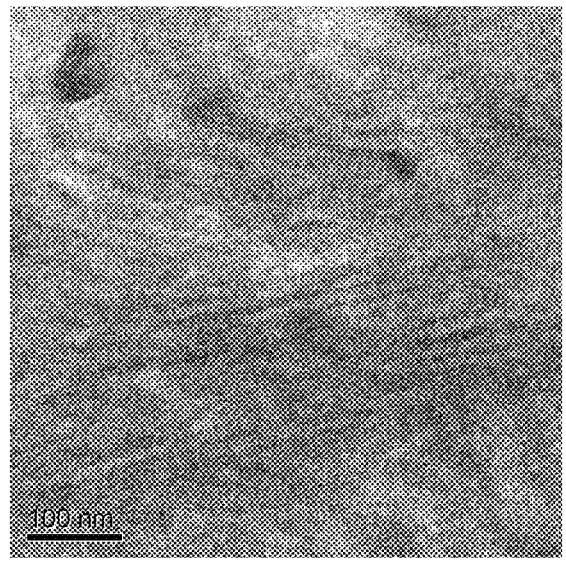
FIG. 6 is a transmission electron micrograph of an organic polymer material which is used in Embodiment 5 of the present invention.

The crystal of the treated polyethylene was tested by transmission electron microscope method, as shown in FIG. 6. As seen from FIG. 6, the treated polyethylene had no nanocrystals.

500 parts by weight of chlorosulfonic acid with a purity of greater than 98% was used as reaction medium. Under the conditions of oil bath or vapor, the temperature was raised to 120° C. 10 parts by weight of the pretreated high density polyethylene were added and reacted at a constant temperature for 12 hours. The resultant product was stood and filtered to obtain 0.5 parts by weight of powder solid. X-ray diffraction of the solid showed that it was mainly amorphous carbon material but did not contain carbon nanocrystals.

In embodiment 3, crystals had not been formed very well in the polymer material, and the carbon nanomaterial could not be obtained. Most of the carbon particles were excessively oxidized or functionalized and then dissolved in the reaction medium.

Embodiment 4: Preparing Spherical Carbon Material from Low Density Polyethylene which had the Crystallization Temperature of 110° C. and a Degree of Crystallization of 35 to 50%

10 parts by weight of low density polyethylene LDPE was melted and the temperature was raised to 160° C. Under the constant temperature of 105° C., the polyethylene was stretched slowly at a rate of 10 cm/s. The stretched sample was quenched in liquid nitrogen. The treated polyethylene was ready for use.

500 parts by weight of chlorosulfonic acid with a purity of greater than 98% was used as reaction medium. Under the conditions of oil bath or vapor, the temperature was raised to 100° C. 10 parts by weight of the pretreated low density polyethylene were added and reacted at a constant temperature for 10 hours. The resultant product was stood and filtered to obtain 3 parts by weight of powder solid. X-ray diffraction of the solid showed that it was carbon material; scanning electron microscope showed that it was mostly fibrous; and the fiber had a diameter of 10 to 30 nm and a length of 10 to 80 micrometers; and transmission electron microscope showed that the crystal of the fibrous material was relative integral. It was found by elemental analysis that the content of sulfonate groups in the carbon nanomaterial was 8%.

Embodiment 5: Preparing Fibrous Carbon Material from Low Density Polyethylene which had the Crystallization Temperature of 110° C. and a Degree of Crystallization of 35 to 50%

10 parts by weight of low density polyethylene LDPE was melted and the temperature was raised to 150° C., and then decreased slowly to 108° C. The temperature was maintained at 108° C. for 96 hours and then decreased slowly to room temperature. The treated polyethylene was ready for use.

500 parts by weight of chlorosulfonic acid with a purity of greater than 98% was used as reaction medium. Under the conditions of oil bath or vapor, the temperature was raised to 100° C. 10 parts by weight of the pretreated low density polyethylene were added and reacted at a constant temperature for 12 hours. The resultant product was stood and filtered to obtain 4 parts by weight of powder solid. X-ray diffraction of the solid showed that it was carbon material; and scanning electron microscope showed that it was mostly spherical material of 20 to 40 nm. It was found by elemental analysis that the content of sulfonate groups in the carbon nanomaterial was 10%.

Embodiment 6: Using Amorphous Polyvinyl Chloride

Polyvinyl chloride used in this embodiment was an amorphous polymer free of crystals. 10 parts by weight of this amorphous polyvinyl chloride were treated at 120° C. with 500 parts by weight of chlorosulfonic acid to obtain 5 parts by weight of amorphous carbon material. X-ray diffraction showed that there was no crystalline carbon substantively.

Embodiment 7: Preparing Spherical Carbon Material by Using Fluorosulfonic Acid as the Strong Oxidant and Using High Density Polyethylene as the Organic Polymer Material The crystallization temperature of the high density polyethylene HDPE 5000S was 136° C., and the degree of crystallization was 80 to 90%.

10 parts by weight of high density polyethylene HDPE 5000S was melted and the temperature was raised to 180° C. and then decreased slowly to 130° C. The temperature was maintained at 130° C. for 48 hours, and then decreased slowly to room temperature. The treated polyethylene was ready for use.

500 parts by weight of fluorosulfonic acid with a purity of greater than 98% was used as reaction medium. Under the conditions of oil bath or vapor, the temperature was raised to 120° C. 10 parts by weight of the treated high density polyethylene were added and reacted at a constant temperature for 12 hours. The resultant product was stood and filtered to obtain 6.5 parts by weight of powder solid. X-ray diffraction of the solid showed that it was carbon material; scanning electron microscope showed that it was mostly spherical material and the size of the carbon sphere was 30 to 60 nm; and transmission electron microscope showed that the spherical material had onion-like crystals and had a good crystal morphology. It was found by elemental analysis that the content of sulfonate groups in the carbon nanomaterial was 6%.

Embodiment 8: Using High Density Polyethylene HDPE 5000S which had the Crystallization Temperature of 136° C. and a Degree of Crystallization of 80 to 90%, and Carrying Out the Carbonization Step at a Temperature Higher than the Crystallization Temperature 10 parts by weight of high density polyethylene HDPE 5000S was melted and the temperature was raised to 180° C. and then decreased slowly to 130° C. The temperature was maintained at 130° C. for 48 hours, and then decreased slowly to room temperature. The treated polyethylene was ready for use.

500 parts by weight of chlorosulfonic acid with a purity of greater than 98% was used as reaction medium. Under the conditions of oil bath or vapor, the temperature was raised to 140° C. 10 parts by weight of the treated high density polyethylene were added and reacted at a constant temperature for 12 hours. The resultant product was stood and filtered to obtain 8 parts by weight of powder solid. X-ray diffraction of the solid showed that it was carbon material; scanning electron microscope showed that a minority of the material was spherical and the size of the carbon sphere was 10 to 30 nm, and most of the material was two-dimensional graphene-like carbon material.

Compared to Embodiment 1, the reaction temperature of Embodiment 8 was higher, and it was higher than the crystallization temperature of the polymer material. This embodiment showed that the reaction carried out at a temperature higher than the crystallization temperature would change the polymer crystals into amorphous state to a certain extent such that the obtained spherical crystals was smaller and there was a large number of graphene-like carbon material in the product.

Embodiment 9: Using High Density Polyethylene HDPE 5000S which had the Crystallization Temperature of 136° C. and a Degree of Crystallization of 80 to 90%, and Carrying Out the Carbonization Step at a Temperature Higher than the Crystallization Temperature 10 parts by weight of high density polyethylene HDPE 5000S was melted and the temperature was raised to 200° C. Under the constant temperature of 125° C., the polyethylene was stretched slowly at a rate of 10 cm/s. The stretched sample was quenched in liquid nitrogen. The treated polyethylene was ready for use.

500 parts by weight of chlorosulfonic acid with a purity of greater than 98% was used as reaction medium. Under the conditions of oil bath or vapor, the temperature was raised to 140° C. 10 parts by weight of the treated high density polyethylene were added and reacted at a constant temperature for 12 hours. The resultant product was stood and filtered to obtain 6 parts by weight of powder solid. X-ray diffraction of the solid showed that it was carbon material; scanning electron microscope showed that a part of the material was fibrous; the fiber had a diameter of 5 to 15 nm and a length of 5 to 20 micrometers; and a part of the material was two-dimensional graphene-like carbon material.

Compared to Embodiment 2, the reaction temperature of Embodiment 9 was higher, and it was higher than the crystallization temperature of the polymer material. This embodiment showed that the reaction carried out at a temperature higher than the crystallization temperature would change the polymer crystals into amorphous state to a certain extent such that the obtained crystals had a smaller size and there was graphene-like carbon material in the product.

Embodiment 10: Application 1

2% of the carbon material prepared by embodiment 1 was blended with ferrous oxalate, lithium carbonate and ammonium dihydrogen phosphate. The mixture was ball milled and then sintered at 750° C. The discharge specific capacity of the prepared lithium iron phosphate material reached 160 mAh/g.

Embodiment 11: Application 2

5 wt % of the carbon material prepared by embodiment 2 was blended with Nylon 66 (Shanghai Jieshijie New Material Co. Ltd.) and extruded to obtain blended material 1. In contrast, 5 wt % of chopped carbon fibers with a diameter of 3 to 5 micrometers and a length of 1 to 3 millimeters (Shanghai Lishuo Composite Technology Co. Ltd.) was blended with Nylon 66 and extruded to obtain blended material 2. Micromorphology of the obtained materials was observed. Moreover, the blended materials prepared as above and pure Nylon 66 were cut and milled into certain shape and size according to Chinese national standards GB/T1447-2005 and GB1449-2005, respectively. The tensile strength and flexural strength were tested on Instron 3369 universal tester. Their performance data were compared in Table 2 (all the data were the average value of five tests).

TABLE 2

| Sample | Tensile strength (MPa) | Flexural strength (MPa) | Microscopic morphology |
|---|---|---|---|
| Nylon 66 | 52.26 | 117.58 | Uniform system |
| Nylon 66 + 5% carbon material of embodiment 2 | 78.32 | 172.65 | Uniform system |
| Nylon 66 + 5% chopped carbon fibers | 58.45 | 121.96 | There are floating fibers, and the chopped fibers are agglomerated |

As seen from the above data, Nylon 66 with addition of the carbon material of embodiment 2 increased a tensile strength by 50% and a flexural strength by 47%, compared to pure Nylon 66. The effect of the present invention could not be achieved by using micrometric chopped fibers in prior art.

The following embodiments relate to the second aspect of the present invention.

Embodiment 12

Figure 7:
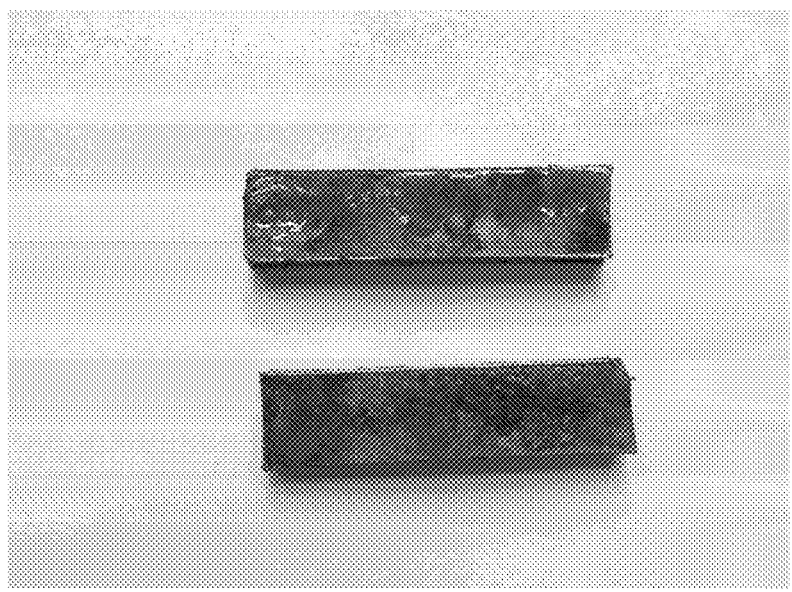
FIG. 7 is a graph of a copper-plated polyethylene product prepared by the method of Embodiment 12 of the present invention.

FIG. 7 showed an embodiment wherein the carbon-adhered material prepared by the method of the second aspect of the present invention was used for copper electroplating. The results confirmed the advantages as stated above for the second aspect.

Embodiment 13

Figure 8:
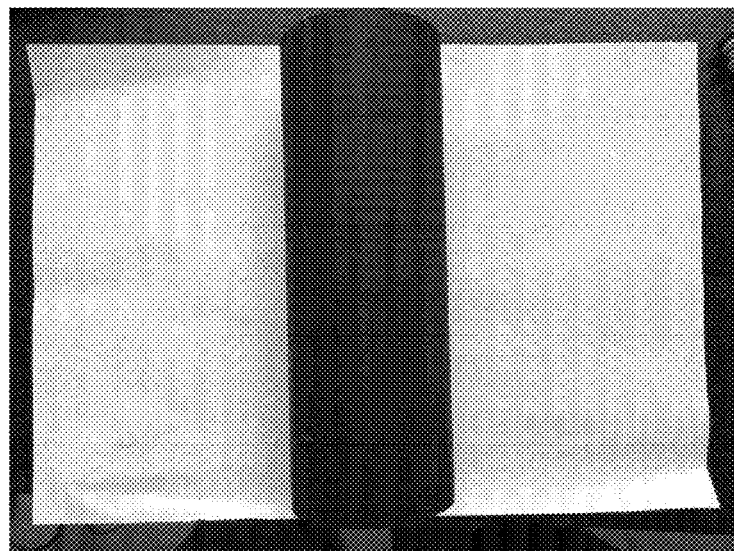
FIG. 8 shows an antistatic tube prepared by the method of Embodiment 13 of the present invention.

FIG. 8 showed the carbon-adhered material produced by the method of the second aspect of the present invention, which was used as an antistatic tube.

Embodiment 14

Figure 9:
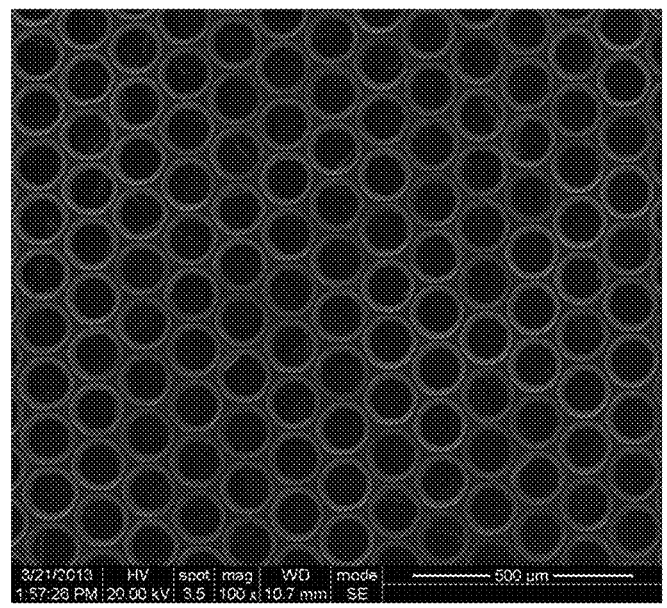
FIG. 9 shows a graphene-like sheet prepared by the method of Embodiment 14 of the present invention.
Figure 10:
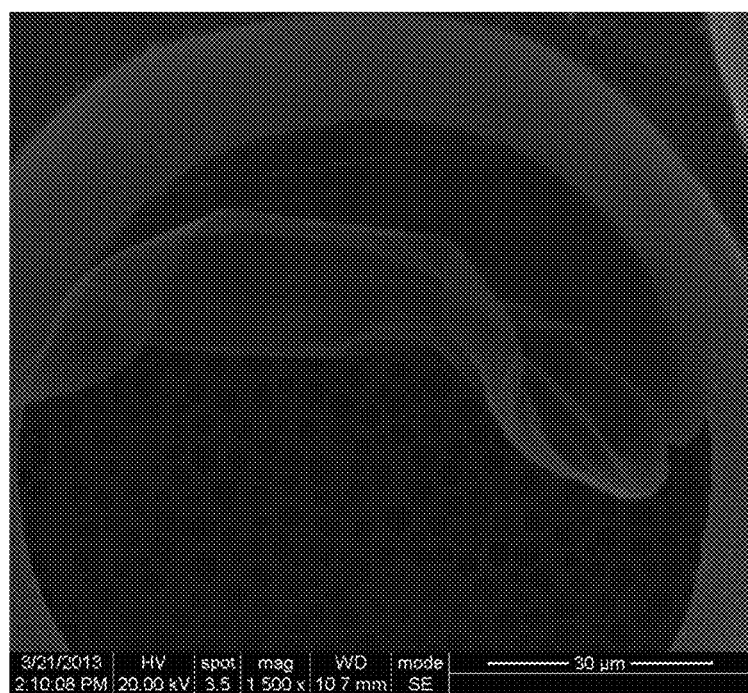
FIG. 10 shows a graphene-like sheet prepared by the method of Embodiment 14 of the present invention.

FIGS. 9 and 10 were transmission electron micrograph of the platy functionalized graphene produced by the method of the second aspect of the present invention, and showed the advantages as stated above for the functionalized graphene powder prepared by the method of the second aspect of the present invention.

Embodiment 15

FIG. 11 was a transmission electron micrograph of the spherical functionalized graphene produced by the method of the second aspect of the present invention; and also showed the advantages as stated above for the functionalized graphene powder prepared by the method of the second aspect of the present invention.

Embodiment 16

FIG. 12 was a transmission electron micrograph of the fibrous functionalized graphene produced by the method of the second aspect of the present invention; and also showed the advantages as stated above for the functionalized graphene powder prepared by the method of the second aspect of the present invention.

The invention has been described with reference to some exemplary embodiments which are not limitative to the scope of the present invention. The scope of the present invention is defined by the accompanying claims.

The present application claims the benefits of the Chinese Patent Application No. 201410244717.0 filed on Jun. 4, 2014, the entire disclosure of which is incorporated herein by reference.

What is to be claimed is:

1. A method for preparing a carbon material, comprising:
a pretreatment step by which a straight-chain polymer material containing nanocrystals is obtained; and
a carbonization step in which the straight-chain polymer material containing nanocrystals is carbonized by using a strong oxidant, thus obtaining a carbon nanomaterial,
wherein the carbonization step is carried out at a temperature which is from 1 to 50° C. lower than the crystallization temperature of the crystalline portion in the polymer material;
wherein the pretreatment step comprises: heating the polymer material to a temperature higher than the crystallization temperature; cooling to a temperature 2 to 7° C. lower than the crystallization temperature and maintaining the temperature for 1 to 100 hours; cooling the polymer material to room temperature at a rate less than 1° C./minute such that onion-like nanocrystals are contained in the polymer material; or
the pretreatment step comprises: heating the polymer material to a temperature higher than the crystallization temperature; cooling to a temperature 2 to 7° C. lower than the crystallization temperature; stretching the polymer material at a speed of 1 cm/s to 1 m/s; quenching the stretched polymer material to room temperature at a rate higher than 20° C./minute such that fibrous nanocrystals are contained in the polymer material.

2. The method according to claim 1, wherein the straight-chain polymer material containing nanocrystals is polyolefins, polyacetylenes, or other straight-chain hydrocarbon polymeric materials with a symmetric structure.

3. The method according to claim 1, wherein the strong oxidant comprises one or more of the followings: a compound of a general formula R—$SO_3H$, wherein R is selected from F, Cl and Br; a combination of $H_2SO_4$ and HCl; a combination of $H_2SO_4$ and HF; concentrated sulfuric acid; fuming sulfuric acid; and a combination thereof.

4. The method according to claim 1, wherein the weight ratio of the polymer material and the strong oxidant is from 1:1 to 1:300.

5. The method according to claim 1, wherein the pretreatment step comprises: heating the polymer material to a temperature higher than the crystallization temperature; cooling to a temperature 2 to 7° C. lower than the crystallization temperature and maintaining the temperature for 1 to 100 hours; cooling the polymer material to room temperature at a rate less than 1° C./minute such that onion-like nanocrystals are contained in the polymer material;
wherein the carbon powder obtained by the method contains onion-like carbon nanospheres.

6. The method according to claim 1, wherein the pretreatment step comprises: heating the polymer material to a temperature higher than the crystallization temperature; cooling to a temperature 2 to 7° C. lower than the crystallization temperature; stretching the polymer material at a speed of 1 cm/s to 1 m/s; quenching the stretched polymer material to room temperature at a rate higher than 20° C./minute such that fibrous nanocrystals are contained in the polymer material;
wherein the carbon powder obtained contains carbon nanofibers.

7. A method for detecting the crystal morphology in a straight-chain polymer material, comprising:
preparing a carbon material from the straight-chain polymer material by the method of claim 1; and determining the micromorphology of the carbon material to reflect the crystal morphology in the straight-chain polymer material.

8. The method according to claim 1, wherein the strong oxidant is free of heavy metal ions.

9. The method according to claim 1, wherein the polymer material is selected from polyethylene wax, chlorinated polyethylene, polyacetylene, halogen-containing polyacetylenes, high density polyethylene, low density polyethylene, medium density polyethylene, polyvinyl chloride, halogen-containing polyolefins, and polypropylene.

10. The method according to claim 1, wherein the strong oxidant is fluorosulfonic acid, chlorosulfonic acid or a combination thereof.

11. The method according to claim 1, wherein the weight ratio of the polymer material and the strong oxidant is from 1:15 to 1:60.

12. The method according to claim 1, wherein the carbonization step is carried out at a temperature which is from 5 to 20° C. lower than the crystallization temperature of the crystalline portion in the polymer material.

13. The method according to claim 1, wherein the pretreatment step comprises: heating the polymer material to a temperature higher than the crystallization temperature; cooling to a temperature 2 to 7° C. lower than the crystallization temperature and maintaining the temperature for 12 to 48 hours; cooling the polymer material to room temperature at a rate less than 1° C./minute such that onion-like nanocrystals are contained in the polymer material;
wherein the carbon powder obtained by the method contains onion-like carbon nanospheres.

14. The method according to claim 1, wherein the pretreatment step comprises: heating the polymer material to a temperature higher than the crystallization temperature; cooling to a temperature 2 to 7° C. lower than the crystallization temperature; stretching the polymer material at a speed of 8 cm/s to 12 cm/s; quenching the stretched polymer material to room temperature at a rate higher than 20° C./minute such that fibrous nanocrystals are contained in the polymer material;
wherein the carbon powder obtained contains carbon nanofibers.

15. The method according to claim 7, wherein the strong oxidant is free of heavy metal ions.

* * * * *